(12) United States Patent
Moyal

(10) Patent No.: US 6,225,832 B1
(45) Date of Patent: May 1, 2001

(54) SIGNAL REGENERATION CIRCUIT

(75) Inventor: Michael Moyal, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/151,964

(22) Filed: Sep. 11, 1998

(30) Foreign Application Priority Data

Sep. 11, 1997 (DE) .............................................. 197 39 960

(51) Int. Cl.[7] ...................................................... H03K 5/01
(52) U.S. Cl. .................................. 327/15; 327/14; 327/165
(58) Field of Search ..................................... 327/53, 63, 65, 327/66, 433, 320, 51, 52, 64, 423, 494, 588, 58, 60, 68, 69, 13, 14, 15, 16, 165, 166, 171; 341/136, 135

(56) References Cited

U.S. PATENT DOCUMENTS

| 3,754,193 | * | 8/1973 | Reinhard | 330/261 |
| 3,869,676 | * | 3/1975 | Harrison et al. | 329/204 |
| 4,070,600 | * | 1/1978 | Butler et al. | 315/169 R |
| 4,161,693 | * | 7/1979 | Carlson | 324/173 |
| 4,401,901 | * | 8/1983 | Ochi | 327/89 |
| 4,728,815 | * | 3/1988 | Main | 327/165 |
| 5,015,891 | * | 5/1991 | Choi | 327/53 |
| 5,077,489 | * | 12/1991 | Gola et al. | 327/77 |
| 5,287,070 | * | 2/1994 | Thelen et al. | 330/253 |
| 5,621,340 | * | 4/1997 | Lee et al. | 327/65 |
| 5,670,910 | * | 9/1997 | Kato | 330/253 |

FOREIGN PATENT DOCUMENTS 0798885  10/1997  (EP) .

* cited by examiner

*Primary Examiner*—Timothy P. Callahan
*Assistant Examiner*—Hai L. Nguyen
(74) *Attorney, Agent, or Firm*—Herbert L. Lerner; Laurence A. Greenberg; Werner H. Stemer

(57) ABSTRACT

The signal regeneration circuit recovers a digital signal from an input signal that is supplied via metallic isolation (galvanic separation). The circuit has two input terminals for the input signal and one output terminal for the recovered digital signal. A current direction sensor detects the current direction prevailing between the input terminals and outputs the signal in accordance with the last prevailing current direction. The circuit is advantageously used in connection with digital circuits that require potential isolation at their input terminals.

8 Claims, 2 Drawing Sheets

SIGNAL REGENERATION CIRCUIT

BACKGROUND OF THE INVENTION

Field of the Invention

The invention relates to a circuit for recovering a digital signal from an input signal received by way of galvanic separation, comprising two input terminals for the input signal and one output terminal for the recovered digital signal.

In the transmission of electrical signals between two systems A and B, it is frequently required that systems A and B must not be galvanically (metallically) connected to one another, that is to say there must not be a direct metallic connection between systems A and B. To galvanically isolate systems A and B, which are intended to exchange signals with one another, the insertion of a capacitor in each of the signal transmission lines or the use of a transformer for a pair of signal lines is possible in line-connected signal transmission. Accordingly, the coupling elements of capacitor or transformer, respectively, allow the transmission of signals between systems A and B without connecting these to one another galvanically.

However, the use of the coupling elements causes a change in the signal variation so that in the transmission of a signal from system A to system B, a device must be provided in system B by means of which the signal variation originally output by system A can be recovered. This is required especially in the case of digital signals because the digital signal processing devices in the receiving system B only operate reliably with defined signal structures.

SUMMARY OF THE INVENTION

It is accordingly an object of the invention to provide a signal regeneration circuit, which overcomes the abovementioned disadvantages of the heretofore-known devices and methods of this general type and which allows a digital signal supplied to a receiver system by way of metallic isolation to be recovered from the received signal.

With the foregoing and other objects in view there is provided, in accordance with the invention, a signal regeneration circuit for recovering a digital signal from an input signal supplied via metallic isolation, comprising:

two input terminals receiving an input signal;

one output terminal outputting a recovered digital signal; and a current direction sensor connected to the two input terminals for detecting a current direction prevailing between the two input terminals and outputting a signal representing the prevailing current direction.

In accordance with an added feature of the invention, the current direction sensor includes a voltage clamping configuration for fixing a voltage between the input terminals and a current mirror comprising an output driver configuration outputting the signal representing the prevailing current direction.

In accordance with an additional feature of the invention, the voltage clamping configuration includes a first series circuit of at least two diodes each connected in a given direction and a second series circuit of at least two diodes each connected in a direction opposite the given direction, the first and second circuits being connected to one another at a center node.

In other words, a preferred signal regeneration circuit has a current direction sensor which detects the current direction prevailing between the input terminals and outputs a signal corresponding to the prevailing current direction. In this configuration, the current direction sensor detects the direction of the current which flows between the two input terminals. The current direction sensor preferably includes a voltage clamping configuration and a current mirror. The voltage clamping configuration fixes the voltage between the input terminals to a predetermined maximum value. The current mirror detects the current flowing between the input terminals and supplies the detected current value to an output driver configuration at which the output signal can be picked up. It is especially preferred in this configuration that the voltage clamping configuration has a first and a second series connection of in each case at least two diodes connected in the same direction. In this configuration, the diodes of the first series circuit are connected in the opposite direction to the diodes of the second series circuit, and the series circuits are connected to one another at a center node.

In accordance with another feature of the invention, the current mirror includes a first current mirror circuit and a second current mirror circuit, the first current mirror circuit reflecting a current flow through the voltage clamping configuration in a first current flow direction and the second current mirror circuit reflecting a current flow through the voltage clamping configuration in a second current flow direction.

In accordance with again an added feature of the invention, the current mirror further includes a third current mirror circuit and a fourth current mirror circuit, the third current mirror circuit being connected to an output current path of the first current mirror circuit and the fourth current mirror circuit being connected to an output current path of the second current mirror circuit.

In accordance with again another feature of the invention, a connecting node connects an output current path of the third current mirror circuit with an output current path of the fourth current mirror circuit, the output current paths of the third and fourth current mirror circuits form the output driver configuration, and the connecting node outputs the output signal representing the prevailing current direction.

These foregoing features define a further, especially preferred exemplary embodiment of the signal regeneration circuit. The current mirror of the current direction sensor thereby has a first and a second current mirror circuit. In this configuration, the first current mirror circuit reflects the current flow through the voltage clamping configuration in a first current flow direction and the second current mirror circuit reflects the current flow through the voltage clamping configuration in a second current flow direction. In addition, it is especially preferred that the current mirror includes the third and fourth current mirror circuits. Here, the third current mirror circuit is connected to the output current path of the first current mirror circuit and the fourth current mirror circuit is connected to the output current path of the second current mirror circuit. The embodiment in which the output current path of the third current mirror circuit and the output current path of the fourth current mirror circuit are connected to one another and form the output driver configuration is especially preferred. The output signal can then be picked up at the connecting node of the output current paths of the third and fourth current mirror circuit.

In accordance with yet an added feature of the invention, the voltage clamping configuration includes a center node and a reference potential is added at the center node of the voltage clamping configuration. In this configuration, the reference potential is fixed with respect to the ground potential of the current direction sensor and thus of the signal-receiving system. The circuit structures of the current mirror can then be designed with respect to the ground potential of the receiving system.

In accordance with yet another feature of the invention, the reference potential has a value that lies within a range of threshold potentials of CMOS transistors in an integrated circuit.

In accordance with yet an additional feature of the invention, the current direction sensor is constructed with a plurality of transistors including bipolar transistors and CMOS transistors. In accordance with yet a further feature of the invention, the input signal is supplied to the inputs via capacitive coupling where capacitances are connected upstream of the two inputs in the signal flow direction.

In accordance with a concomitant feature of the invention, the current direction sensor comprises a buffer for temporarily storing a last prevailing current direction. In a preferred embodiment the buffer is constructed as a flip flop.

Other features which are considered as characteristic for the invention are set forth in the appended claims.

Although the invention is illustrated and described herein as embodied in a signal regeneration circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
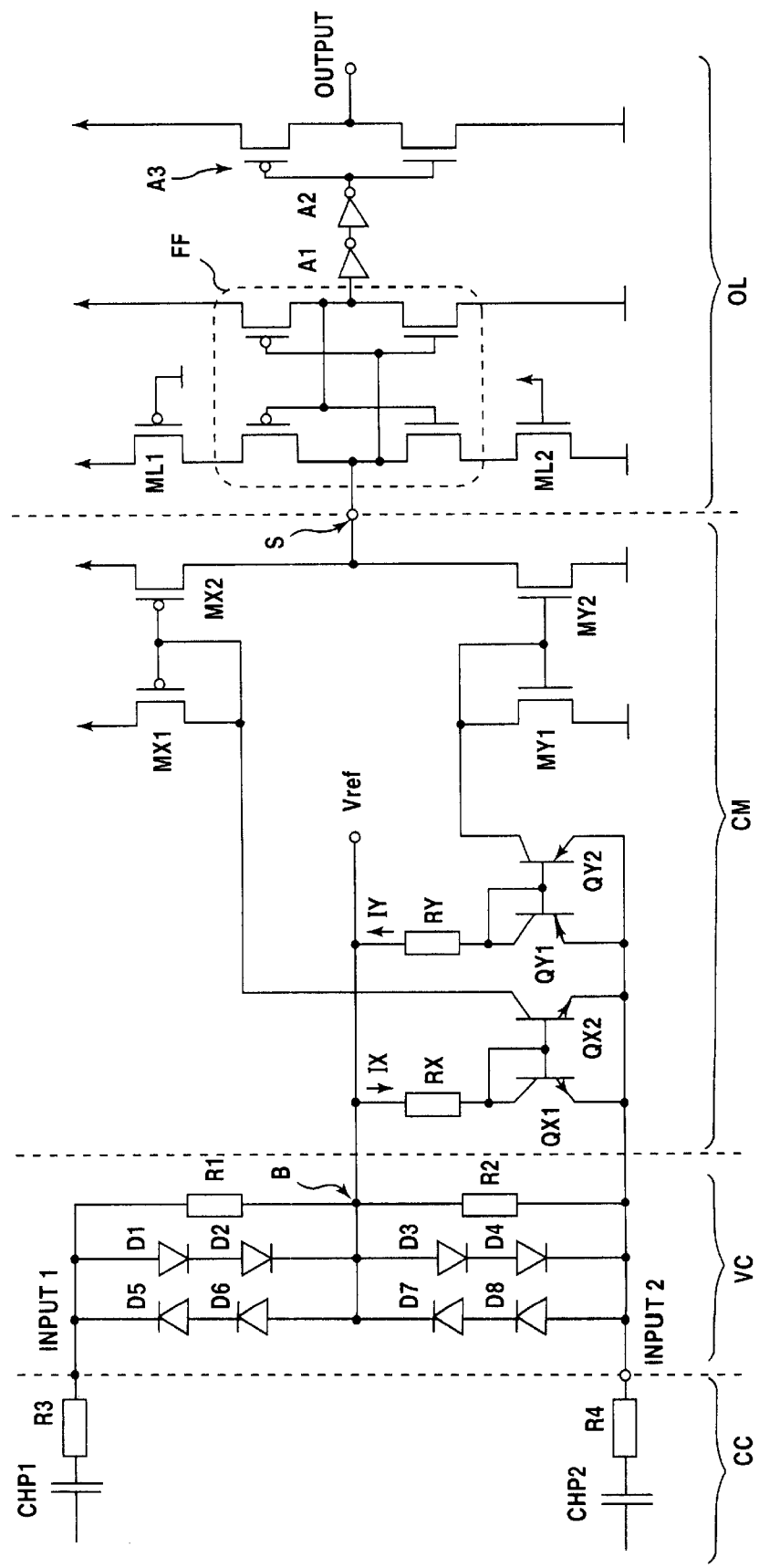
FIG. 1 is a circuit schematic of a preferred exemplary embodiment of the signal regeneration circuit according to the invention.

Referring now to the figures of the drawing in detail and first, particularly, to FIG. 1 thereof, there is seen a circuit that is essentially subdivided into four circuit blocks. A circuit block CC relates to the capacitive coupling between two signal lines. Circuit blocks VC, CM and OL together form a current direction sensor according to a preferred exemplary embodiment of the invention. The current direction sensor according to FIG. 1 includes a voltage clamping configuration VC, a current balancing configuration or current mirror CM and a buffer configuration OL. The current direction sensor is supplied via the capacitive coupling CC with a typically differential input signal that is evaluated by the current direction sensor and output as recovered input signal at its output terminal OUTPUT. The capacitive coupling configuration, in each of the signal lines, includes one coupling capacitor CHP1 and CHP2 and a series-connected resistor R3 and R4, respectively. The free terminals of the resistors R3 and R4, respectively, are connected to the input signal terminals INPUT1 and, respectively, INPUT2 of the voltage clamping cofiguration VC of the current direction sensor.

The voltage clamping configuration includes two series of diodes D1, D2, D3, D4 and, respectively, D5, D6, D7, D8 which are connected in antiparallel and which are connected at their free ends to the input signal terminals INPUT1 and, respectively, INPUT2. A series circuit of resistors R1 and R2 is connected in parallel with the diode series circuits. The free ends of the resistor series circuit R1+R2 are also connected to the signal input terminals INPUT1 and, respectively, INPUT2. The two diode series circuits and the resistor series circuit are connected to one another at a center node B. The center node B is connected to a reference potential Vref which is fixed with respect to the ground potential of the receiving system. The signal input terminals INPUT1 and, respectively, INPUT2 are thus above and, respectively, below the reference voltage Vref by two diode conducting voltages $V_D$ with respect to the ground potential of the receiving system to which the current direction sensor belongs. In an integrated circuit, the diodes D1 to D8 are preferably constructed as bipolar transistors, the collector and base of which are short-circuited and thus emulate the function of a diode in a simple manner in the integrated circuit.

In the current mirror CM of the current direction sensor, the input current paths of a first and of a second current mirror circuit are connected between the center node B and the node of the input signal terminal INPUT2. The input current path of the first current mirror circuit includes a resistor RX and a bipolar transistor QX1 of the npn type which is short-circuited to form a diode. The input current path of the first current mirror circuit is thus connected in the same conducting direction as the diode series circuit D1 to D4. The input current path of the second current mirror circuit includes a resistor RY and a bipolar transistor QY1 of the pnp type which is short-circuited to form a diode. Thus, the input current path of the second current mirror circuit has the same conducting direction as the diode series circuit D5 to D8. The maximum current IX through the input current path of the first current mirror circuit and the maximum current IY through the input current path of the second current mirror circuit are identical in amounts. The current direction, however, is opposite in accordance with the diode switching direction. The amounts are:

$$[1] = |IX| = |IY| = (2V_D - V_{BE})/RX$$

where $V_D$ is the conducting voltage of a diode of the diode series circuits D1 to D8 and where $V_{BE}$ is the base-emitter voltage of transistor QX1 and, respectively, QY1. Since $V_D \approx V_{BE} \approx 0.7$ V, the following result is obtained:

$$[2] = |IX| = |IY| = 0.7V/RX$$

whereby the resistors RX and RY have the same dimensions for reasons of symmetry. Accordingly, the same amounts of current are thus obtained for IX and IY.

In the output current path of the first current mirror circuit, the collector-emitter path of an npn transistor QX2 is located and in the output current path of the second current mirror circuit, the collector-emitter path of a pnp transistor QY2 is located. The base terminals and the emitter terminals of transistors QX1 and QX2 and of transistors QY1 and QY2 are connected to one another in order to form a current mirror circuit. The output current path of the first current mirror circuit is connected to the input current path of a third current mirror circuit and the output current path of the second current mirror circuit is connected to the input current path of a fourth current mirror circuit. In the input current path of the third current mirror circuit, the load path of a p-channel MOS transistor MX1 is located. A free end of the load path of the transistor MX1 is connected to the supply voltage terminal of the receiving system. In addition, the gate terminal of the transistor MX1 is connected to the connecting node of the transistors QX2 and MX1. Similarly, the output current path of the second current mirror circuit is connected to the input current path of a fourth current mirror circuit. In the input current path of the fourth current mirror circuit, the load path of an n-channel MOS transistor MY1 is located, the free end of the load path being connected to the ground potential of the receiving system. The gate terminal of transistor MY1 is connected to the connecting node of transistors QY2 and MY1.

The output current path of the third current mirror circuit is formed by a p-channel MOS transistor MX2 and the output current path of the fourth current mirror circuit is formed by the load path of an n-channel MOS transistor MY2. A free end of the load path of the transistor MX2 is connected to the supply voltage terminal of the receiving system and a free end of the load path of the transistor MY2 is connected to the ground terminal of the receiving system. The gate terminals of the transistors MX1 and MX2 and of transistors MY1 and MY2 are connected to one another in order to form a current mirror circuit. The load paths of the transistors MX2 and MY2 of the third and fourth current mirror circuit are connected to one another at a node S. At the node S, a logic signal can be picked up which indicates the current direction that is instantaneously prevailing between the input terminals INPUT1 and INPUT2.

The current mirror CM is followed by the output buffer configuration OL in the signal flow direction. The output buffer configuration OL stabilizes the output signal at the node S of the current mirror CM. The output buffer circuit OL includes a flip flop FF consisting of CMOS inverters, the input terminal of which is connected to the output node S of the current mirror CM. One of the inverters of the flip flop FF also includes load transistors ML1 and ML2 which are also configured in complementary MOS technology. At the output terminal of the flip flop, three series-connected inverters A1, A2 and A3 are connected. The inverter A3 is configured and dimensioned as a CMOS output driver. The output signal OUTPUT of the signal regeneration circuit of the invention is available at the output terminal of the inverter A3.

The voltage clamping configuration with the antiparallel-connected diode series circuits D1 to D4 and, respectively, D5 to D8 clamps the voltage between the signal input terminals INPUT1 and INPUT2 to a value which is four times a diode conducting voltage $V_D$ by amount. With respect to the center node B, the voltage at the signal input terminal INPUT 2 moves between Vref+$2V_D$ and Vref–$2V_D$ with respect to the ground potential of the receiving system. It should be mentioned at this point that in the case of a rectangular differential input signal present at capacitors CHP1 and CHP2, the capacitors CHP1 and CHP2 discharge exponentially via resistors R1 and, respectively, R2 after each change in voltage level in the input signal. In this case, the current direction of the discharge current determines the logic state of the input signal. A first current direction is detected in the input current path of the first current mirror circuit and the second current direction is detected in the input current path of the second current mirror circuit. Although the input current paths of the first and second current mirror circuit according to FIG. 1 are connected between the center node B and the node of the input terminal INPUT2, the circuit operation can also be implemented with only a slightly different configuration if the input current path of the first or second current mirror or of the first and second current mirror is connected between the center node B and the node of the input terminal INPUT1.

The current IX in the input current path of the first current mirror circuit is reflected in its output current path and, at the same time, supplied to the input current path of the third current mirror circuit. Similarly, the current IY in the input current path of the second current mirror circuit is reflected in its output current path and supplied to the input current path of the fourth current mirror circuit. Since at a particular time, either only the first current mirror circuit or only the second current mirror circuit is in each case active, the output current paths of the third and fourth current mirror circuit can be connected to one another in order to pick up the output signal at the connecting node S.

If, for example, a negative input signal is present, that is to say the voltage difference between the input terminal INPUT1 and input terminal INPUT2 is negative and a current flows from the input terminal INPUT2 to the input terminal INPUT1, a voltage which is twice a diode conducting voltage $V_D$ above the reference voltage Vref with respect to the ground potential of the receiving system is present at the input terminal INPUT2. Thus, a current IY calculated as above flows through the input current path of the second current mirror circuit. This current IY is reflected to the output current path of the second current mirror circuit, multiplied by the fourth current mirror circuit and applied via the node S to the flip flop FF in order to switch the state of the latter. Thus, the flip flop switches between the input terminals INPUT1 and INPUT2 in accordance with the currently prevailing current direction. The switching currents of the flip flop FF can be set by means of the load transistors ML1 and ML2.

Figure 2:
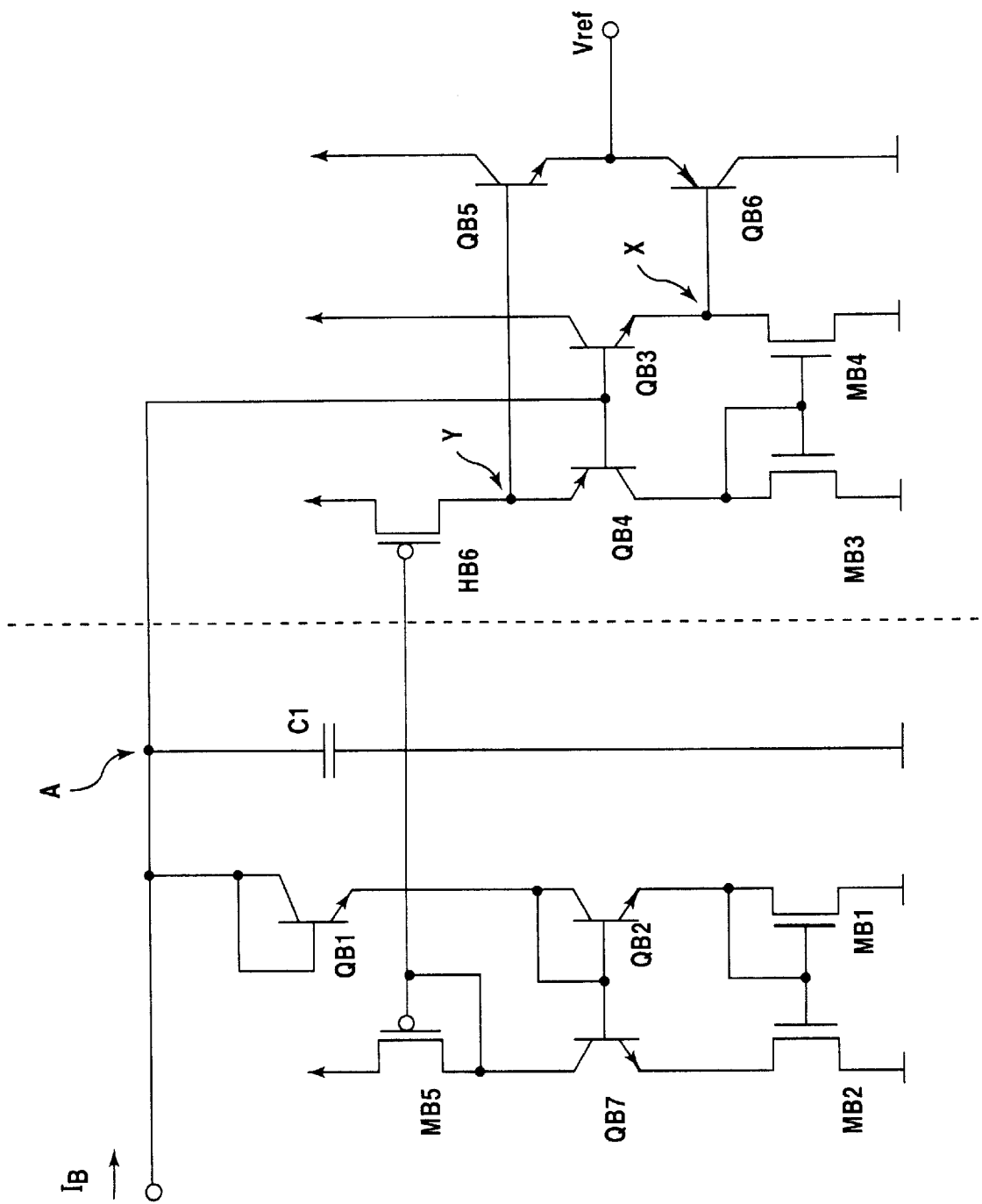
FIG. 2 is a circuit schematic of a novel circuit for generating a reference potential.

Referring now to FIG. 2, there is shown a circuit for generating the reference potential Vref. For this purpose, a current $I_B$ with a very low value is supplied to a node A. This current flows via npn transistors QB1 and QB2, which are connected together to form diodes, and the load path of an n-channel MOS transistor away to the ground terminal of the receiving system. This results in a voltage drop of twice the base-emitter voltage $V_{BE}$ of transistors QB1 and QB2 and the threshold voltage VT of MOS transistor MB1. At the n-channel MOS transistor MB2, this current is reflected into an output current path via transistors MB1 and MB2 which are connected together to form a current mirror circuit. The output current path consists of the load path of transistor MB2, the collector-emitter path of an npn transistor QB7 which is also connected together with transistor QB2 to form a current mirror circuit, and the load path of a p-channel MOS transistor MB5. Via transistor MB5, the current in the output current path of the current mirror is reflected to the load path of a p-channel MOS transistor MB6. The latter activates a pnp transistor QB4 and drives a further current mirror consisting of n-channel or MOS transistors MB3 and MB4. In the output current path of this current mirror circuit, the load path of transistor MB4 and the collector-emitter path of an npn transistor QB3 is located, which, as a result, is also activated. The base of an output transistor QB5 of the npn type is connected to a connecting node Y of transistor MB6 and of transistor QB4. The base of an output transistor QB6 of the pnp type is connected to a connecting node X between the emitter of transistor QB3 and the load path of transistor MB4. The emitters of output transistors QB5 and QB6 are connected to one another and are at the required voltage Vref.

In this configuration, the voltage Vref is at the same magnitude as the potential at the node A. This is due to the fact that the bases of the transistors QB3 and QB4 are also connected to the node A and the transistors QB3 and QB4 are kept activated by the current mirrors of transistors MB3 and MB4 and, respectively, MB5 and MB6. Thus, the node Y is above the potential of the node A by the voltage drop across the base-emitter diode of the transistor QB4. The voltage drop across the base-emitter diode of the transistor QB5 then brings one back to the potential of the node A. The same result is obtained from the node A via the base-emitter path of the transistor QB3 to the node X and from there via the base-emitter path of the transistor QB6 to the output terminal Vref. Through the output stage of the transistors QB5 and QB6, the reference voltage Vref can be picked up with low impedance and push-pull capability at the output terminal.

The circuit according to FIG. 2 belongs to the receiving system and, accordingly, is referred to its ground potential. This also applies to the supply voltage terminals, illustrated in FIG. 2, at the free ends of the load paths of transistors MB5, MB6, QB3 and QB5. Between node A and the ground potential, a capacitor C1 is also connected which filters out high-frequency noise from a surrounding supply voltage source or clock system sources. The voltage at node A, and thus the output voltage Vref, is twice a base-emitter voltage above the threshold voltage of a MOS transistor with respect to the ground potential of the receiving system.

The circuit according to the invention makes it possible to regenerate a differential input signal which is supplied via coupling capacitors CHP1 and CHP2 to the receiving system via input terminals INPUT1 and INPUT2, as such referred to the ground potential of the receiving system and to output this signal at an output terminal OUTPUT. Accordingly, no direct current flows between the transmitting system and the receiving system and only an alternating-current component is transmitted. The circuit according to the invention can be constructed in a simple manner completely integrated in a semiconductor structure.

I claim:

1. A signal regeneration circuit for recovering a digital signal from an input signal supplied via metallic isolation, comprising:

two input terminals receiving an input signal;

one output terminal outputting a recovered digital signal; and a current direction sensor connected to said two input terminals for detecting a current direction prevailing between said two input terminals and for outputting a signal representing the prevailing current direction, said current direction sensor including a voltage clamping configuration for fixing a voltage between said two input terminals, said current direction sensor including a first input transistor and a second input transistor connected to said two input terminals, said first input transistor being of a first conductivity type and said second input transistor being of a second conductivity type opposite said first conductivity type;

said current direction sensor including a current mirror having a first current mirror circuit, a second current mirror circuit, a third current mirror circuit, and a fourth current mirror circuit, the first current mirror circuit reflecting a current flow through said voltage clamping configuration in a first current flow direction and said second current mirror circuit reflecting a current flow through said voltage clamping configuration in a second current flow direction, said third current mirror circuit connected to an output current oath of said first current mirror circuit and said fourth current mirror circuit connected to an output current path of said second current mirror circuit, said current mirror forming an output driver configuration outputting the signal representing the prevailing current direction.

2. The circuit according to claim 1, wherein said current direction sensor is constructed with a plurality of transistors including bipolar transistors and CMOS transistors.

3. The circuit according to claim 1, wherein said voltage clamping configuration includes a first series circuit of at least two diodes each connected in a given direction and a second series circuit of at least two diodes each connected in a direction opposite the given direction, said first and second circuits being connected to one another at a center node.

4. The circuit according to claim 1, wherein the input signal is supplied to said inputs via capacitive coupling.

5. The circuit according to claim 1, wherein said current direction sensor comprises a buffer for temporarily storing a last prevailing current direction.

6. The circuit according to claim 1, which further comprises a connecting node connecting an output current path of said third current mirror circuit with an output current path of said fourth current mirror circuit, the output current paths of said third and fourth current mirror circuits forming said output driver configuration, and said connecting node outputting the output signal representing the prevailing current direction.

7. The circuit according to claim 1, wherein said voltage clamping configuration includes a center node and a reference potential is present at said center node of the voltage clamping configuration.

8. The circuit according to claim 7, wherein the reference potential has a value lying within a range of threshold potentials of CMOS transistors in an integrated circuit.

* * * * *